United States Patent
Wilton

[15] 3,668,790
[45] June 13, 1972

[54] VARIABLE TERRAIN MODEL
[72] Inventor: Raymond C. Wilton, Worthing, England
[73] Assignee: The Singer Company, Binghamton, N.Y.
[22] Filed: Dec. 8, 1969
[21] Appl. No.: 883,009

[30] Foreign Application Priority Data
Dec. 12, 1968 Great Britain.....................59,219/68

[52] U.S. Cl. ..................................35/12 N, 35/12 L, 35/41
[51] Int. Cl. .......................................G09b 9/08, B64g 7/00
[58] Field of Search ..................................35/12 L, 12 N, 41

[56] References Cited

UNITED STATES PATENTS

| | | | |
|---|---|---|---|
| 3,052,753 | 9/1962 | Schwartz et al.........................35/12 N |
| 3,188,911 | 6/1965 | Eisenberg et al.......................35/41 X |

FOREIGN PATENTS OR APPLICATIONS

| | | | |
|---|---|---|---|
| 30,180 | 7/1884 | Germany......................................35/41 |
| 255,624 | 7/1926 | Great Britain...............................35/41 |
| 158,807 | 5/1957 | Sweden........................................35/41 |
| 87,424 | 5/1956 | Norway........................................35/41 |

Primary Examiner—Robert W. Michell
Assistant Examiner—L. R. Oremland
Attorney—Francis L. Masselle, William Grobman and Charles S. McGuire

[57] ABSTRACT

A terrain model suitable for use with a viewing device to simulate terrain features of the real world with means for varying in a controlled manner the elevation of various portions of the model, thereby allowing the contour of the terrain to be changed quickly and easily. The changes are accomplished by movable actuators located beneath a deformable, elastic sheet. Means are also provided for maintaining permanent features, such as buildings, in the proper vertical relationship as the slope of the surface thereunder is varied.

2 Claims, 5 Drawing Figures

VARIABLE TERRAIN MODEL

The present invention relates to terrain models and is particularly directed to improvements in such models used in conjunction with training apparatus such as vehicle simulators.

As the level of sophistication of vehicle simulators used to train operators has steadily increased, the use of visual simulation systems in conjunction with such training apparatus has become more important. Visual simulation systems of various types are presently in commercial use with fixed-base training devices for automobiles and aircraft, for example. Among the most common of such visual simulation systems are those employing a motion picture display of a filmed sequence of the training environment, and terrain model systems with suitable viewing means to simulate relative motion of the training device and the model which appears to the trainee as a simulated real world scene. These two systems may also be combined since the terrain model may be used, rather than actual terrain, in filming a training sequence for later display.

It is often desirable, of course, to vary certain terrain features in the visual simulation system in order to provide training sequences in various terrain environments. Although means have been provided for changing the simulated positional viewpoint of the observer in a motion picture display (see, for example, U.S. Pat. Nos. 2,999,322 and 3,281,529) the terrain features are fixed on the film. Terrain models are somewhat more flexible in this regard since the features may be changed by rearranging or replacing portions of the model. However, there may be a considerable amount of time and expense involved in manually altering a terrain model of appreciable size to present substantially different terrain features. The invention may also be used to advantage in connection with the preparation of ground contour maps with terrain models as disclosed, for example, in U.S. Pat. No. 3,188,911.

The principal object of the present invention is to provide a terrain model which may be varied to present a virtually unlimited number of topographical changes extremely quickly and with the same model elements.

An additional object is to provide a camera model visual simulation system of greatly expanded versatility with regard to the manner of changing the contour of the area represented by the model.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
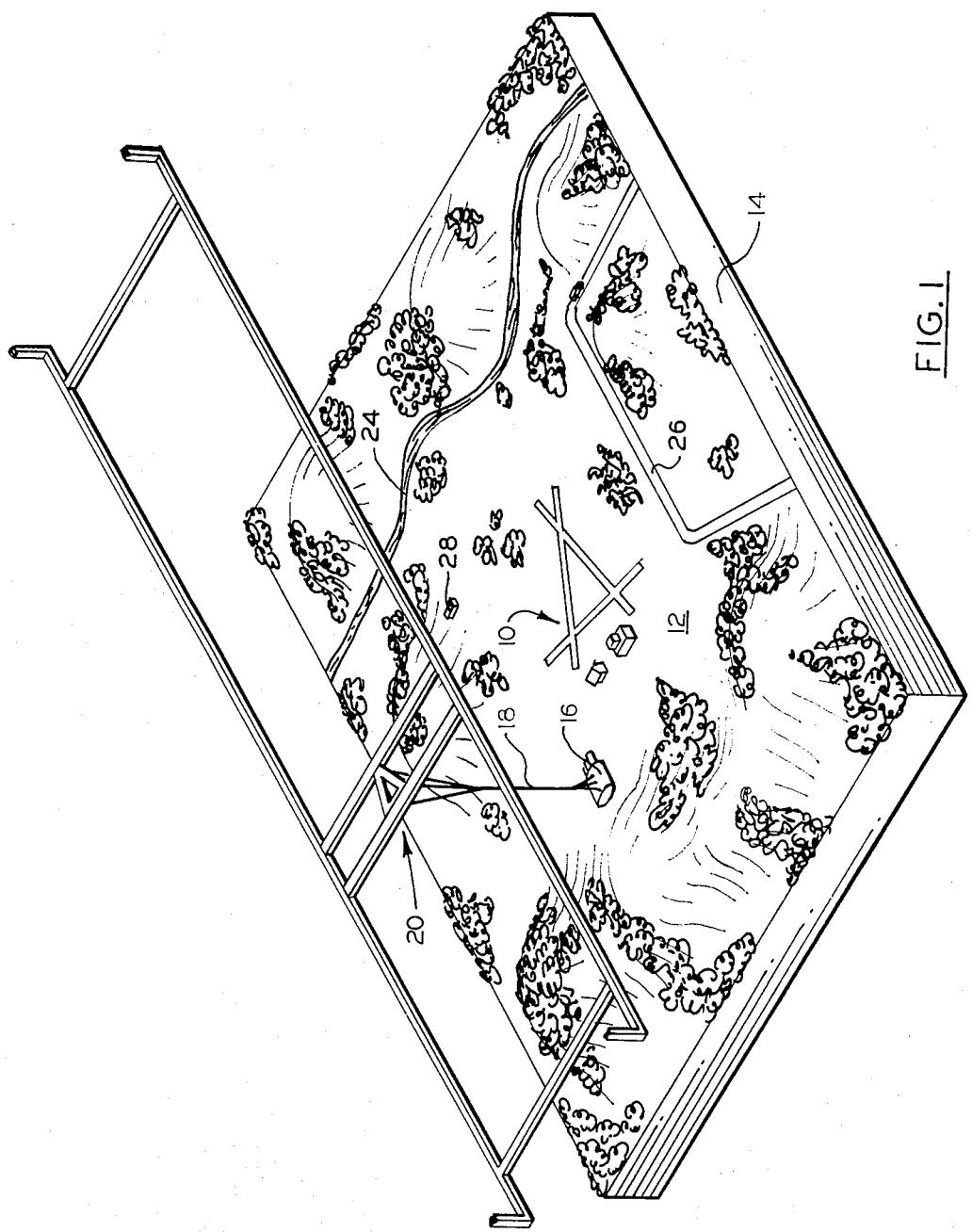
FIG. 1 is a perspective view of a terrain model showing an example of the intended principal field of use of the invention.

The terrain model having novel alteration means of the present invention is suitable for a wide variety of applications, one of which is indicated by the showing of FIG. 1 of the drawings. In this application, the terrain model includes a small airport facility with surrounding hills, valleys, and other topographical features simulating an area of the real world on a greatly reduced scale. In order to present a visual display of the terrain model to the operator of a flight simulator in a manner creating a visual impression of viewing a real world scene, a television camera is mounted for movement relative to the model in response to signals generated by the simulator controls. That is, the television camera will follow the simulated flight path of the aircraft trainer, as determined by the operator's movement of the simulated control members, and transmit video signals for display of a scene analogous to that which would be seen through the cockpit window of an aircraft following the same flight path relative to the real world. Means for mounting and moving a television camera relative to a terrain model in accordance with signals commensurate with the position of an actual aircraft are disclosed in U.S. Pat. No. 2,959,779. The terrain model of the present invention may be used, of course, in visual simulation systems used with actual aircraft, as in the referenced patent, but the capability of changing the appearance of the model provided in the present invention is normally more useful with aircraft simulator visual display systems. The means for controlling camera movement, as well as transmitting and displaying the image of the model, are the same for flight simulators as for actual aircraft. Therefore, these principles are not discussed or shown in detail herein, being fully disclosed in U.S. Pat. No. 2,959,779.

The model airport facility, having a number of runways to which simulated approaches and landings may be made, is designated generally in FIG. 1 by the reference numeral 10. The runways, as well as other features mentioned later herein, are painted or otherwise appropriately applied in a manner creating a realistic appearance upon the upper surface of a unitary sheet 12 of rubber, plastic, or the like, having a resilient, elastic nature. Sheet 12 is secured over a rectangular frame 14 which rests on a fixed support surface. Camera 16 is supported for movement in 6° of freedom upon a boom 18 and gantry arrangement 20, as disclosed more fully in U.S. Pat. No. 2,959,779.

Figure 2:
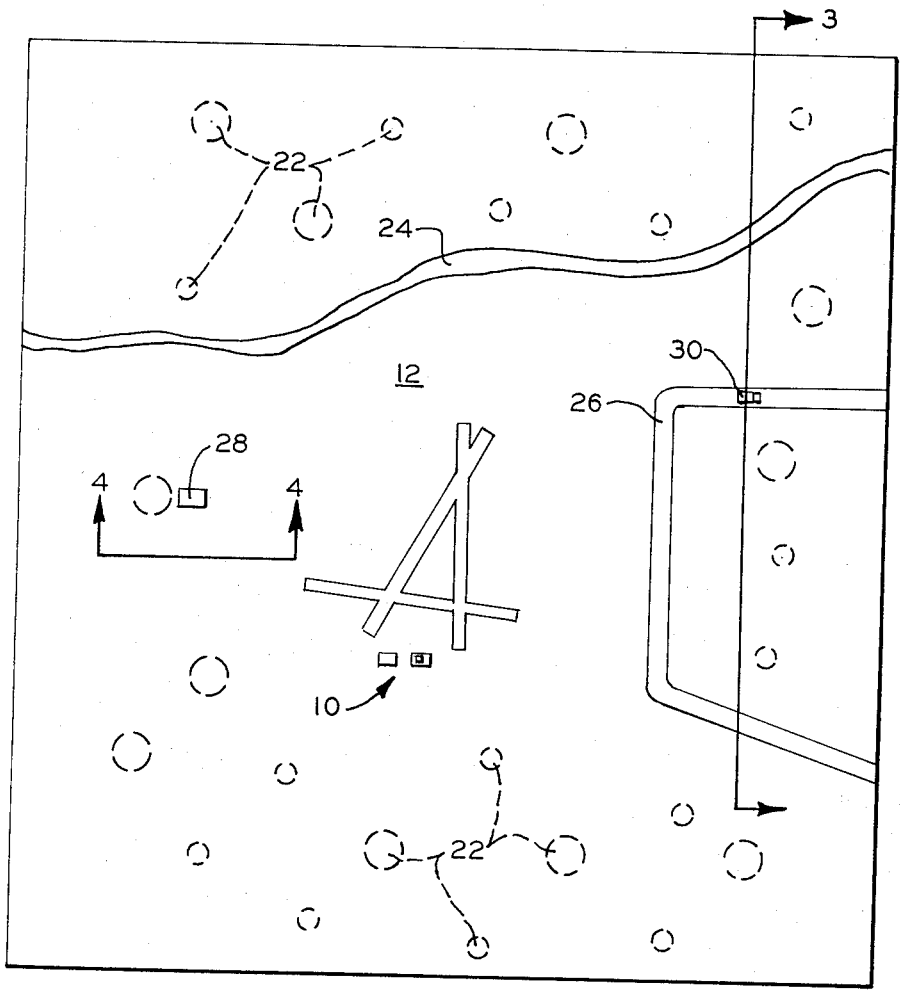
FIG. 2 is a plan view of the terrain model of FIG. 1, showing the location of additional elements of the invention.

The hills and general contour of the terrain model evident in FIG. 1 are produced by deforming sheet 12 by vertical movement of actuators located thereunder. Exemplary locations of a number of such actuators, denoted by reference numeral 22, are indicated in the plan view of FIG. 2. The number and location of the actuators, which may be arranged in a regular or random pattern, is determined by the requirements of the particular terrain model design. Trees, shrubbery, streams and rivers, such as that indicated at 24, and other natural terrain features may be provided as desired in accordance with well-known modeling techniques. Likewise, manmade features such as roads 26, buildings 28, towers, etc., are provided as desired.

Figure 3:
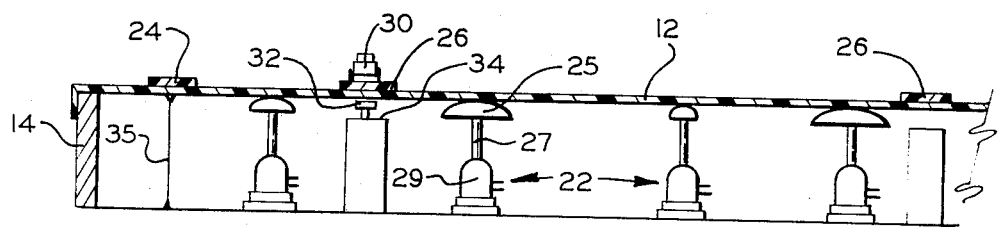
FIG. 3 is a sectional view along the line 3—3 of FIG. 2.

A number of actuators 22 are shown in the sectional view of FIG. 3, each including a head portion 25 having a curved surface in contact with the bottom of sheet 12, a telescoping cylinder 27, and base portion 29. Head portions 25 may be moved to deform sheet 12 by extension or retraction of cylinders 27 under any appropriate power such as mechanical, electrical, hydraulic, pneumatic, or combinations thereof. For purposes of illustration, cylinders 27 are assumed to be moved by hydraulic pressure upon electrical actuation of a conventional valve within base 29, as explained later in more detail.

The nature of the terrain model contours will be governed by the physical properties of sheet 12, as well as the configuration and degree of movement of the various actuators 22. The material and thickness of sheet 12 may be selected to provide the desired type of deformation, many well-known rubber and plastic compositions being suitable. It is preferred that each of actuator heads 25 be attached firmly to sheet 12, rather than merely supporting the sheet, to allow stepper changes in contour by holding down portions of the sheet while raising closely adjacent portions. Also, as indicated in FIG. 3, it is preferred that actuator heads 25 be provided with different curvatures on the surface which contacts sheet 12 to allow a number of slightly different terrain configurations, especially at peak elevation points, to be achieved. It may further be found desirable to make the elasticity of sheet 12 somewhat different in the areas adjacent the points of attachment of actuator heads 25, for example, by providing some means of compliant reinforcement (not shown) in such areas. This will bring about a further slight modification of the profile of the upper surface at these points by smoothing out the points at which the actuators are attached to the sheet.

To increase the effectiveness of the visual display, motion may be imparted to elements provided thereon. For example, vehicles such as that indicated by reference numeral 30 may be provided on roadway 26 and moved by means of magnet 32 arranged on moving track means 34 beneath sheet 12. To prevent changes in elevation of certain portions of the model which are intended to remain stationary, means may be provided for affixing certain areas of sheet 12 to the fixed base. For example, rigid links 35 are provided under river 24 to prevent the latter from assuming unnatural positions as the contour of sheet 12 is changed. Similar means are preferably provided for maintaining airport 10 in a flat plane.

Figure 4:
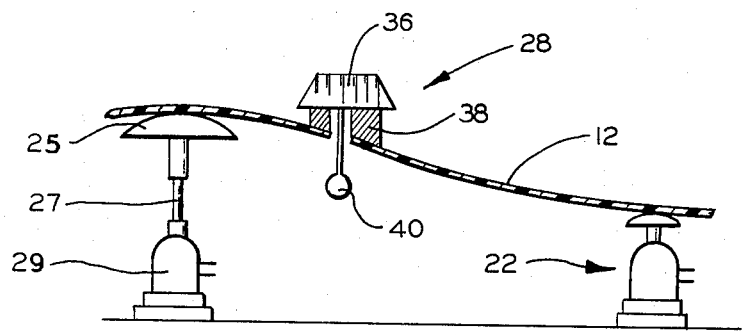
FIG. 4 is a sectional view along the line 4—4 of FIG. 2.

Simple yet effective means for preventing structures such as building 28 from assuming an unnatural leaning position as the contour of the surface upon which they are supported is changed are indicated in FIG. 4. The upper portion of the structure, such as roof 36, is made of a rigid material, while the lower portion 38 is made of a highly resilient material such as foam rubber. Weight 40 is fixedly attached to rigid roof section 36 by means of a rod extending through a central opening in the model building and a small opening in sheet 12. The tendency of weight 40 to hang vertically will cause the roof section to compress the resilient lower portion on the uphill side, thereby causing the building to remain essentially vertical.

Figure 5:
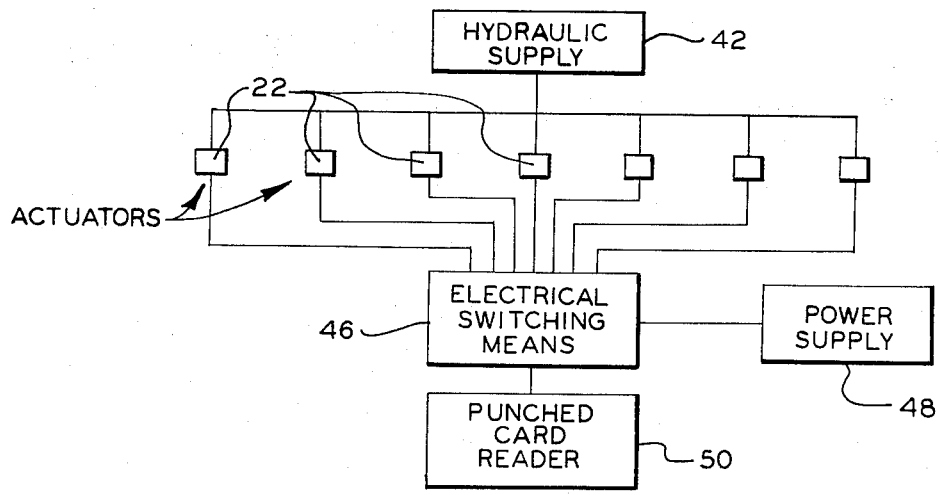
FIG. 5 is a block diagram showing an example of means for operating portions of the invention.

FIG. 5 is a block diagram showing one example of suitable means for operating actuators 22. Each of the actuators is connected to a source of hydraulic fluid under pressure, indicated by block 42. Fluid flow into and out of the actuators to extend and retract cylinders 27 is controlled by conventional electrically actuated valves. An appropriate electrical power supply and switching means for the individual valves are indicated by blocks 46 and 48, respectively. The switching means may be controlled manually or by any of the usual automatic programming means commonly used in such applications. For example, a large number of different positional combinations of actuators 22, produced by specified actuations of switching means 46, may be programmed on punched cards in the usual manner. A selected card for producing the desired terrain contour may be placed in card reader 50 which is properly interfaced with switching means 46 to effect control thereof.

I claim:

1. A variable terrain model for use in a visual simulation system, said model comprising, in combination:
   a. a unitary sheet of deformable material having a surface simulating an area of the real-world surface on a reduced scale;
   b. means located beneath said sheet and movable between a plurality of positions in contact with said sheet to change the contour thereof, and thereby the appearance of said simulated real-world surface;
   c. means for selectively adjusting said movable means;
   d. scale models of terrain features having a fixed relation to the real-world gravity vector; and
   e. means for causing said fixed relation to be maintained as the contour of the portion of said sheet supporting said features is varied said last-named means comprising a rigid upper portion and resilient lower portion of said scale model, a rigid link fixedly attached to said upper portion and depending therefrom through a central opening in said lower portion, and a weight on the lower end of said link, whereby the force of gravity on said weight urges said link, and thereby said scale model to remain in said fixed relation.

2. The invention according to claim 1 wherein said link extends through an opening provided therefor in said sheet, said weight being positioned below said sheet.

* * * * *